United States Patent Office 3,446,899
Patented May 27, 1969

3,446,899
VITAMIN COMPOSITIONS PRODUCED BY DIRECT COMPRESSION
Arnold Cavalli, Belleville, and Louis Magid, Clifton, N.J., assignors to Hoffmann-La Roche Inc., Nutley, N.J., a corporation of New Jersey
No Drawing. Continuation-in-part of application Ser. No. 456,841, May 18, 1965, now abandoned. This application Jan. 25, 1968, Ser. No. 700,351
Int. Cl. A61k 15/00
U.S. Cl. 424—280                                    10 Claims

ABSTRACT OF THE DISCLOSURE

A vitamin composition containing sorbose, either alone or in combination with one or more other carbohydrates, and a lubricant is described.

The disclosed composition is capable of being compressed directly, i.e. without first being granulated, into tablets.

CROSS REFERENCE TO RELATED APPLICATION

This application is a continuation-in-part of our U.S. patent application Ser. No. 456,841, filed May 18, 1965, now abandoned.

BACKGROUND OF THE INVENTION

Chewable vitamin-containing tablets, as well as processes for producing same, are well known in the prior art. In producing these tablets, it is the normal practice to prepare a granulation which contains the vitamin components in admixture with conventional excipients and adjuvants and subsequently to compress such granulations into tablets. In general, there are two well-known methods for preparing satisfactory granulations. The first such method is a wet granulation process. The second method is a dry granulation process which is commonly referred to as "slugging."

The wet granulation process of the prior art has several essential steps. In the first step of the wet granulation process, a mixture is prepared containing a major portion of the various materials to be included in the tablet. In the second step, such mixture is moistened with a suitable liquid which can if desired contain also a binding agent. In the third step of the wet granulation process, the moistened mixture is passed through a comminuting device to convert the moistened mixture into granules. Thereafter, in succeeding steps, the granules are dried and comminuted to provide particles of desired size. Finally, conventional lubricants are added to the granulation and intimately admixed therewith. The granulation, which is thus obtained, is then compressed into tablets using ordinary tabletting equipment. From the foregoing, it will be appreciated that, due to the number of steps involved, the production of tablets by the wet granulation method leaves much to be desired.

The dry granulation process of the prior art is somewhat more efficient than the wet granulation procedure. The dry granulation process involves a fewer number of steps, and, hence, is far more economical than the multi-step wet granulation procedure. In the dry granulation process, the ingredients which are to be included in the tablets are admixed following which they are compressed into slugs, i.e., into oversized tablets. By appropriate grinding methods, these slugs are broken down into granules of substantially uniform size. These granules are, thereafter, compressed into tablets by regular techniques.

It has long been recognized that improvements in the conventional tabletting procedures of the prior art are needed. The number of operations involved in such procedures, and the time and, hence, expense, required to obtain the desired tablets, renders these processes highly inefficient. The present invention provides a practical and economically feasible means for producing chewable tablets from non-granulated vitamin-containing mixtures.

BRIEF SUMMARY OF THE INVENTION

The present invention is predicated upon the finding that sorbose, either alone or in admixture with one or more other carbohydrate compounds, is useful in the production of vitamin tablets by direct compression methods. In carrying out the invention, a mixture is produced containing (1) a vitamin material or materials, (2) from about 60% to about 95% by weight of sorbose, or from about 60% to about 95% by weight of a mixture of sorbose with one or more other carbohydrate compounds and (3) a lubricant. Where the sorbose is used in admixture with at least one other carbohydrate compound, the sorbose must comprise at least about 30% of the weight of the total carbohydrate content.

The mixture, without granulation, is compressed into tablets of desired size and shape.

DETAILED DESCRIPTION

In its most comprehensive embodiment, the present invention is concerned with novel vitamin-containing compositions.

In a more specific embodiment, the invention is concerned with dry vitamin-containing mixtures which are capable of being compressed into chewable tablets without first granulating same.

In other embodiments of the invention, the invention is concerned with the process for producing the vitamin-containing mixture and with the use of such compositions in the production of vitamin and multi-vitamin chewable tablets.

It has been found that when (1) a vitamin, or a mixture of vitamins, is admixed with (2) sorbose or with a mixture of sorbose and a carbohydrate compound selected from the group consisting of dextrose, lactose, sucrose, mannitol, sorbitol and a mixture thereof and (3) a lubricant, in the presence or absence of other conventional tabletting excipients or adjuvants, the dry product which is thus obtained can be compressed directly into chewable tablets having outstanding physical and chemical characteristics. Ordinarily, the carbohydrate materials used will be coarse or moderately coarse powders, 60% of the particles passing through a No. 40, 420-micron or a No. 60, 420-micron sieve, as defined in the U.S.P. XVI, at pages 931 and 932.

The compositions of this invention can contain as the active vitamin ingredient thereof, a fat-soluble vitamin, a mixture of fat-soluble vitamins, a water-soluble vitamin material, a mixture of water-soluble vitamins, or mixtures of one or more fat-soluble vitamins with one or more water-soluble vitamins. Thus, for example, the invention comprehends the production of compositions containing fat-soluble vitamins, such as vitamin A, vitamin D, vitamin E, vitamin K and mixtures thereof. Additionally, the invention embraces the production of compositions containing water-soluble vitamins, for example, vitamin B, i.e., vitamin $B_1$, vitamin $B_2$, vitamin $B_6$, vitamin $B_{12}$, and vitamin C and mixtures thereof. Moreover, the compositions of the invention can contain niacinamide; salts of pantothenic acid, such as, calcium pantothenate; pantothenyl alcohol, etc. as well as other such ingredients as are found in conventional vitamin and multivitamin compositions. The invention embraces also compositions containing mixtures of any of the foregoing ingredients. A class of products which are produced in the preferred practice of this invention are chewable multi-vitamin tablets containing, for example, vitamin A, vitamin D, vitamin E, vitamin C, vitamin $B_1$, vitamin $B_2$, vitamin $B_6$, and vitamin $B_{12}$. Tablets containing vitamin A as the sole vitamin component as well as tablets containing vitamin C as the sole vitamin component are produced in other preferred embodiments of this invention.

The vitamin A, vitamin D, vitamin E and vitamin B components are used in the practice of this invention in the form of stabilized pharmaceutical powders. These powders are well known in the prior art, being conventionally used in the production of chewable tablets. While suitable products are commercially available under a variety of trade names, it is preferred to use vitamin A and vitamin A and D products sold under the trade name PalmAbeads and vitamin B products sold under the trade name Rocoat. The PalmAbeads and Rocoat products are manufactured and sold by Hoffmann-La Roche Inc., Nutley, N.J.

The vitamin compositions of this invention contain sorbose as an essential ingredient. If desired, the sorbose can be used as the sole carbohydrate component. In the alternative, the carbohydrate component can comprise sorbose in admixture with a material selected from the group consisting of dextrose, lactose, sucrose, glucose, mannitol and sorbitol and mixtures thereof. Thus, for example, one can employ sorbose either in admixture with dextrose, lactose, sucrose, glucose, mannitol or sorbitol or in admixture with two or more of such carbohydrates. The quantity of the sorbose employed is variable within rather wide limits. In general, sorbose, or the mixture of sorbose with some other carbohydrate or carbohydrates, will comprise from about 60% to about 95% of the weight of the composition, prior to tabletting. Where a carbohydrate mixture is used, i.e. where sorbose is used in admixture with one or more other carbohydrates, the sorbose will comprise at least about 30% and, preferably, from about 45% to about 65% of the weight of the carbohydrate mixture.

In general, any conventional tabletting lubricant can be used in producing the present compositions. Calcium stearate is employed as the lubricant in the preferred practice of the invention. In lieu of calcium stearate, stearic acid or magnesium stearate can be employed. Additionally, mixtures of calcium stearate, stearic acid and/or magnesium stearate can be employed. Furthermore, there can be used a mixture of calcium stearate, magnesium stearate or stearic acid with talc, cornstarch, etc. The quantity of lubricant which is used is variable. Generally, the lubricant will comprise from about 0.25% to about 10.0% of the weight of the mixture prior to its compression into tablets.

The compositions of this invention are readily prepared. The preparative method comprises mixing the carbohydrate materials and the lubricant, or lubricant mixture, with the vitamin or with the vitamin mixture. The mixture which is thus obtained is capable of being compressed directly, i.e., without first granulating same, into chewable tablets having outstanding physical and chemical characteristics. These characteristics include, for example, good chewability, taste, stability and hardness. The tablets are produced by conventional techniques utilizing customary tabletting equipment.

In addition to the essential ingredients, named heretofore, there can be added to the mixture, prior to its compression into tablets, the adjuvant and excipients normally found in vitamin tablets. These include, for example, sweetening agents, such as, saccharin; sodium sucaryl; flavoring agents; and coloring agents. In the case of the optional components, the quantity thereof employed can be varied within rather wide ranges. In all instances, a sufficient quantity of the ingredient will be used to serve its intended purpose.

The present invention provides an economical and commercially feasible means for producing chewable vitamin-containing tablets. The practice of the present invention eliminates the necessity of preparing a granulation, either by the wet or dry procedures of the prior art, and it obviates the several steps required by such procedures. Furthermore, this invention provides tablets having outstanding properties, such as, good chewability, taste, hardness and stability.

The results which flow from the practice of this invention were entirely unexpected. In and of itself, the presence of sugars in tablet formulations is not novel. However, it was not anticipated that the use of sorbose either alone or in combination with some other carbohydrate or carbohydrates would produce a composition which could be compressed into tablets without first granulating same. With the exception of mixtures containing sorbitol, mixtures containing a single sugar have, at best, been found to be poorly compressible. Sorbitol-containing mixtures are compressible, but the tablets obtained therefrom are extremely hygroscopic. This property is, obviously, detrimental to the labile vitamins in the formulation. The tablets of the present invention which contain sorbose in admixture with sorbitol are superior to those tablets of the prior art which contain only sorbitol.

For a fuller understanding of the nature and objects of this invention, reference may be had to the following examples which are given merely as further illustrations of the invention and are not to be construed in a limiting sense. All parts given in the examples are parts by weight unless otherwise indicated.

Example 1

In this example, 7.65 parts of ascorbic acid and 20.05 parts of sodium ascorbate were first intimately admixed. To this mixture there was added 28.74 parts of sorbitol and 27.0 parts of sorbose. Subsequently, there was added to the mixture 1.3 parts of sodium sucaryl, 0.13 part of soluble saccharin, 0.28 part by weight of cherry flavor and 2.6 parts of calcium stearate. The mixture was then compressed directly, i.e., without first granulating same, into tablets weighing 880 mg.

The chewable tablets, thus obtained, were characterized by their good stability, chewability, taste and hardness properties.

Example 2

In this example, chewable ascorbic acid tablets were produced by the method described in Example 1 using, with but one exception, the same ingredients and the same quantities as were employed in Example 1. In producing the product of this example, 32.74 parts of lactose were used in place of the 28.74 parts of sorbitol employed in Example 1.

The mixture, which was obtained, was compressed directly, i.e., without first granulating same, into tablets weighing 900 mg. These tablets had outstanding stability, chewability and hardness characteristics. Additionally, they were devoid of any unpleasant taste.

Example 3

In this example, 6.0 parts of dry vitamin A acetate (500,000 U.S.P. units per gram), 40.0 parts or sorbitol, and 33.0 parts of sorbose were intimately admixed. Thereafter, 1.0 part of calcium stearate was added to, and distributed throughout, the mixture. The mixture thus obtained was subsequently compressed directly into tablets weighing 800 mg.

The tablets produced in this example exihibited outstanding stability, chewability and hardness characteristics. Furthermore, the vitamin A component of the tablet was stable and the tablet was devoid of any unpleasant taste.

Example 4

In this example, 6.0 parts of dry vitamin A acetate (500,000 U.S.P. units per gram), 23.0 parts or sorbitol, 40.0 parts of sorbose and 10.0 parts of dicalcium phosphate dihydrate were intimately admixed. Thereafter, 1.0 part of calcium stearate was added to, and distributed uniformly throughout the mixture.

The mixture, thus obtained, was compressed directly into tablets weighing 800 mg. These tablets exhibited outstanding stability, chewability and hardness characteristics. The tablets were devoid of any unpleasant taste and the vitamin component thereof exhibited excellent stability characteristics.

Example 5

In this example, vitamin A-containing tablets were produced by the method described in Example 3, using, except as noted hereinafter, the same ingredients and the same quantities thereof as were employed in Example 3. In this example, 33.0 parts of sorbitol were used in place of the 40.0 parts of sorbitol employed in Example 3. Additionally, 10.0 parts of a microcrystalline cellulose were used in this formulation.

The mixture, thus obtained, was compressed directly into tablets weighing 800 mg. These tablets were found to possess outstanding stability characteristics and they exhibited completely satisfactory chewability and hardness properties. The tablets were devoid of any unpleasant taste.

Example 6

In this example, tablets were prepared by the procedure described in Example 5 using, with but one exception, the same ingredients and the same quantities thereof as were employed in Example 5. In this example, 10.0 parts of lactose were used and the 10.0 parts of microcrystalline cellulose used in producing the product of Example 5 was omitted.

The mixture which was obtained was compressed directly into tablets weighing 800 mg. These tablets had outstanding stability characteristics and they exhibited completely satisfactory chewability and hardness properties. They were devoid of any unpleasant taste.

Example 7

In this example, 44.0 parts of vitamin C and 39.0 parts of sodium ascorbate were admixed with the following named vitamins in the quantities hereinafter indicated:

| | Parts |
|---|---|
| Vitamin $B_1$ mononitrate | 11.26 |
| Vitamin $B_2$ | 11.7 |
| Vitamin $B_6$ hydrochloride | 3.6 |
| Vitamin $B_{12}$ (0.1% in gelatin) | 1.3 |

The vitamin $B_1$ mononitrate, vitamin $B_2$ and vitamin $B_6$ hydrochloride employed were products manufactured and sold by Hoffmann-La Roche Inc., Nutley, N.J., under the trade name Rocoat thiamine mononitrate 33⅓%, Rocoat riboflavin and Rocoat pyridoxine 33⅓%, respectively.

To the mixture which was obtained there was added 66.0 parts of niacinamide and 12.5 parts of a powder containing 500,000 I.U. of vitamin A and 100,000 I.U. of vitamin D. As the niacinamide component Rocoat niacinamide, 33.3%, was used. The vitamin A and D-containing powder employed was the product sold by Hoffmann-La Roche Inc. under the trade name PalmAbeads, type 500A/100D. Subsequently, 15.0 parts by weight of dry vitamin E acetate, 33.3%, was added to the vitamin mixture.

To the vitamin mixture, prepared as described in the preceding paragraph, there was added 290.0 parts of sorbose and 270.0 parts of sorbitol. Subsequently, there was added 10.0 parts of sodium sucaryl, 0.8 parts of saccharin, 4.0 parts of FD & C Yellow #5 Lake, 8.33 parts of lemon flavor and 2.8 parts of calcium stearate. The mixture, which was thus obtained, was compressed directly into tablets weighing 790 mg.

The tablets which were produced as described in the preceding paragraph, were characterized by their outstanding stability and by their excellent hardness, chewability and taste characteristics.

Example 8

(a) In this example, a mixture was prepared using 77.0 parts of ascorbic acid, 201.0 parts of sodium ascorbate, 10.0 parts of sodium sucaryl, 1.0 part of sodium saccharin, 3.0 parts of cherry flavor and 10.0 parts of calcium stearate. To the mixture, there was added 500 parts of sorbose. The mixture was compressed directly, i.e. without first granulating same, into tablets weighing 802 mg.

The tablets thus obtained were characterized by their good stability, chewability, taste and hardness properties.

(b) Compositions were produced as described in section (a) of this example, using, with but one exception, the same ingredients and the same quantities thereof as were used in section (a). In these instances, in place of the 500 parts of sorbose, the following mixtures were used:

I—250 parts of sorbose plus 250 parts of mannitol
II—250 parts of sorbose plus 250 parts of dextrose
III—250 parts of sorbose plus 250 parts of lactose
IV—250 parts of sorbose plus 250 parts of sorbitol
V—250 parts of sorbose plus 250 parts of sucrose
VI—250 parts of sorbose plus 50 parts of dextrose plus 50 parts of sucrose plus 100 parts of mannitol-lactose mixture (50%–50%)

The mixtures, thus obtained, were compressed directly, i.e. without first granulating same, into tablets weighing 802 mg. In each instance, the tablets were characterized by their outstanding stability and by their excellent hardness, chewability and taste properties.

Example 9

(a) In this example, 60.0 parts of dry vitamin A acetate (500,000 U.S.P. units per gram), 10 parts calcium stearate and 4.0 parts of flavor were admixed. To this mixture there was added 730 parts of sorbose. The mixture, thus obtained, was compressed directly, i.e. without first granulating same, into tablets weighing 804 mg.

The tablets, thus obtained, were characterized by their good stability, chewability and hardness properties.

(b) Compositions were produced as described in section (a) of this example using, but with one exception, the same ingredients and the same quantities thereof as were used in section (a). In these instances, in lieu of the 730 parts of sorbose, the following mixtures were used:

I—365 parts of sorbose plus 365 parts of mannitol
II—365 parts of sorbose plus 365 parts of dextrose
III—365 parts of sorbose plus 365 parts of lactose
IV—365 parts of sorbose plus 365 parts of soribitol
V—365 parts of sorbose plus 365 parts sucrose
VI—365 parts of sorbose plus 73 parts of dextrose plus 73 parts of sorbitol plus 73 parts of sucrose plus 146 parts mannitol-lactose mixture (50%–50%).

The mixtures, thus obtained, were compressed directly, i.e. without first granulating same, into tablets weighing 804 mg. In each instance, the tablets produced exhibited outstanding stability and excellent hardness, chewability and taste characteristics.

Example 10

(a) In this example, 44.0 parts of ascorbic acid and 39.0 parts of sodium ascorbate were admixed with the following named vitamins in the quantities hereinafter indicated:

| | Parts |
|---|---|
| Vitamin $B_1$ mononitrate | 11.26 |
| Vitamin $B_2$ hydrochloride | 11.7 |
| Vitamin $B_6$ | 3.6 |
| Vitamin $B_{12}$ (0.1% in gelatin) | 1.3 |

The vitamin $B_1$ mononitrate, vitamin $B_2$ and vitamin $B_6$ hydrochloride employed were products sold under the trade names Rocoat thiamine mononitrate 33⅓%, Rocoat riboflavin and Rocoat pyridoxine 33⅓%, respectively.

To the mixture there was added 66.0 parts of niacinamide and 12.5 parts of a powder containing 500,000 I.U. per gram of vitamin A and 50,000 I.U. per gram of vitamin $D_2$. As the niacinamide component, the commercially available Rocoat niacinamide 33⅓% was used. The vitamin A and D-containing powder employed was a product sold under the trade name PalmAbeads Type 500 A–150 D. Subsequently, 8.75 parts of a dry vitamin E powder (60%) was added to the vitamin mixture.

To the vitamin mixture prepared as described in the preceding paragraphs there was added 570 parts of sorbose. Subsequently, there was added 10.0 parts of sodium sucaryl, 1.0 part of sodium saccharin, 4.0 parts of FD and C Lake No. 5 ,8.0 parts of lemon flavor and 8.0 parts of calcium stearate.

The mixture which was thus obtained compressed directly into tablets weighing 800 mg. The tablets which were thus produced were characterized by their outstanding stability and by their excellent hardness, chewability and taste characteristics.

(b) Additional compositions were produced as described in section (a) of this example using, with but one exception, the same ingredients and the same quantities thereof as were used in producing the products of section (a). In these instances, in place of the 570 parts of sorbose, the following sugar mixtures were used:

I—285 parts of sorbose plus 285 parts of mannitol
II—285 parts of sorbose plus 285 parts of dextrose
III—285 parts of sorbose plus 285 parts of lactose
IV—285 parts of sorbose plus 285 parts of sorbitol
V—285 parts of sorbose plus 285 parts of sucrose
VI—285 parts of sorbose plus 57 parts of dextrose plus 57 parts of sorbitol plus 57 parts of sucrose plus 114 parts of mannitol-lactose mixture (50%–50%).

The mixtures, thus obtained, were compressed directly, i.e. without first granulating same, into tablets weighing 800 mg. In each instance, the tablets were characterized by their outstanding stability, and by their excellent hardness, chewability and taste properties.

We claim:

1. A vitamin composition, directly dry compressed into chewable tablets without first granulating same, consisting of (1) a vitamin material, (2) a carbohydrate material selected from the group consisting of sorbose and a mixture of sorbose with one or more of dextrose, lactose, sucrose, mannitol and sorbitol, and (3) a lubricant, said ingredient (2) comprising from about 60% to about 95% of the weight of the said vitamin composition with the proviso that, where sorbose is used in a mixture with another carbohydrate material, the quantity of sorbose present must be at least about 30% by weight of the carbohydrate mixture, each carbohydrate material present being in the form of a coarse or moderately coarse powder.

2. The composition of claim 1 wherein ingredient (1) is a material selected from the group consisting of fat-soluble vitamins, water-soluble vitamins and mixtures thereof.

3. The composition of claim 2 wherein there is present a lubricant material selected from the group consisting of stearic acid, calcium stearate, magnesium stearate and mixtures thereof.

4. Composition of claim 2 wherein ingredient (1) is a water-soluble vitamin.

5. The composition of claim 2 wherein ingredient (1) is a fat-soluble vitamin.

6. The composition of claim 2 wherein the ingredient (1) is a mixture of fat-soluble vitamins and water-soluble vitamins.

7. The composition of claim 4 wherein the water-soluble vitamin is ascorbic acid.

8. The composition of claim 5 wherein the fat-soluble vitamin is vitamin A.

9. A vitamin composition, directly dry compressed into the chewable tablets without first granulating same, consisting of (1) a vitamin material selected from the group consisting of fat-soluble vitamins, water-soluble vitamins and mixtures thereof, (2) sorbose, and (3) a lubricant, said sorbose being in the form of a coarse or moderately coarse powder and comprising from about 60% to about 95% of the weight of said vitamin composition.

10. A vitamin composition, directly dry compressed into chewable tablets without first granulating same, consisting of (1) a vitamin material selected from the group consisting of fat-soluble vitamins, water-soluble vitamins and mixtures thereof, (2) a mixture of sorbose with one or more dextrose, lactose, sucrose, mannitol, sorbitol and (3) a lubricant, said ingredient (2) being in the form of a coarse or moderately coarse powder and comprising from about 60% to about 95% of the weight of said vitamin composition, said sorbose comprising at least about 30% of the weight of ingredient (2).

References Cited

UNITED STATES PATENTS

| | | | |
|---|---|---|---|
| 3,138,532 | 6/1964 | Aiello et al. | 424—344 X |
| 3,145,146 | 8/1964 | Lieberman et al. | 424—34 |
| 3,200,039 | 10/1965 | Thompson | 424—280 X |
| 3,384,546 | 5/1968 | Palermo | 424—280 X |

FOREIGN PATENTS 6,511,632  3/1966  Netherlands.

OTHER REFERENCES

Chem. Abstracts 44: 8555e–8557a (1960).

LEWIS GOTTS, *Primary Examiner.*

S. K. ROSE, *Assistant Examiner.*

U.S. Cl. R.X.

424—14, 201, 236, 237, 252, 255, 263, 266, 284, 319, 344, 361